(12) United States Patent
Mizoguchi et al.

(10) Patent No.: US 6,639,929 B2
(45) Date of Patent: Oct. 28, 2003

(54) PULSE OSCILLATING GAS LASER DEVICE

(75) Inventors: Hakaru Mizoguchi, Hiratsuka (JP); Koji Kakizaki, Oyama (JP); Takashi Saito, Oyama (JP); Naoki Kataoka, Oyama (JP)

(73) Assignee: Gigaphoton Inc., Tokyo (JP)

( * ) Notice: Subject to any disclaimer, the term of this patent is extended or adjusted under 35 U.S.C. 154(b) by 0 days.

(21) Appl. No.: 09/987,316

(22) Filed: Nov. 14, 2001

(65) Prior Publication Data

US 2003/0031225 A1 Feb. 13, 2003

(30) Foreign Application Priority Data

Aug. 10, 2001 (JP) ........................... 2001-243258

(51) Int. Cl.[7] .............................................. H01S 3/22
(52) U.S. Cl. ........................................ 372/55; 372/57
(58) Field of Search ............................ 372/34, 102, 83, 372/100, 58, 87, 57, 86, 55

(56) References Cited

U.S. PATENT DOCUMENTS

| 5,408,490 A | * | 4/1995 | Terai et al. ............... 372/83 |
| 5,771,258 A | * | 6/1998 | Morton et al. ............ 372/57 |
| 5,978,405 A | * | 11/1999 | Juhasz et al. ............ 372/102 |
| 5,991,324 A | * | 11/1999 | Knowles et al. .......... 372/100 |
| 6,023,486 A | * | 2/2000 | Hofmann et al. ......... 372/34 |
| 6,061,376 A | * | 5/2000 | Hofmann et al. ......... 372/34 |
| 6,430,205 B2 | * | 8/2002 | Bragin et al. ............. 372/58 |

FOREIGN PATENT DOCUMENTS

JP   4-328889   11/1992

* cited by examiner

*Primary Examiner*—Paul Ip
*Assistant Examiner*—Hung T Vy
(74) *Attorney, Agent, or Firm*—Armstrong, Westerman & Hattori, LLP

(57) ABSTRACT

A pulse oscillating gas laser device, which can reduce an influence of a shock wave caused by primary discharge and perform stable laser oscillation is provided. To this end, the device is a pulse oscillating gas laser device for exciting a laser gas by causing primary discharge in a pulse form between a pair of discharge electrodes (14, 15) opposing each other and oscillating laser light, in which a rib portion (42) with insulating properties for preventing creeping discharge is provided on a cathode base (36) with insulating properties, to which the discharge electrode (15) at a high voltage side is fixed, and a damping material (45) for attenuating a shock wave (41) caused by the primary discharge is inserted in an inside of a groove portion (52) between a raised portion (43) of the rib portion (42) and the high-voltage side discharge electrode (15).

8 Claims, 15 Drawing Sheets

F I G. 3
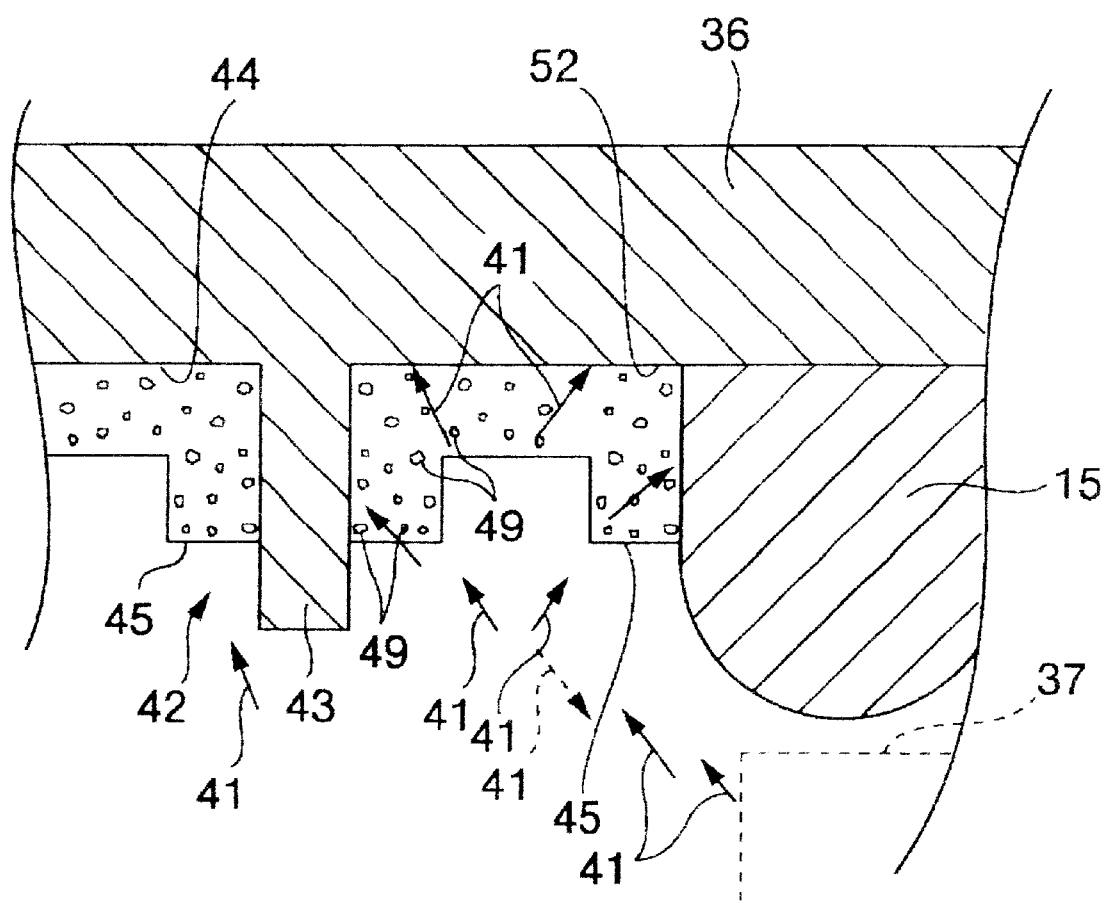

PULSE OSCILLATING GAS LASER DEVICE

TECHNICAL FIELD

The present invention relates to a pulse oscillating gas laser device such as an excimer laser device.

BACKGROUND ART

In a pulse oscillating gas laser device such as an excimer laser device, it is conventionally known that shock waves and acoustic waves (hereinafter, generally referred to as shock waves) occur on the occasion of pulse discharge. Due to the shock waves, fluctuations occur to the density of a laser gas, and a beam profile, energy, and wavelength of laser light become unstable. The art of preventing this is disclosed in, for example, Japanese Patent Application Laid-open No. 4-328889. FIG. 17 shows a detail view of an area near discharge electrodes of an excimer laser device 11 disclosed in Japanese Patent Application Laid-open No. 4-328889, and a prior art will be explained hereinafter based on FIG. 17.

In FIG. 17, meal discharge electrodes 14 and 15 are placed to oppose each other inside a laser chamber 12 in which a laser gas is sealed. An upper cathode 15 is fixed to a cathode base 36 with insulating properties, and the cathode base 36 is fixed to the laser chamber 12. A lower anode 14 is mounted on an anode base 40 electrically connected to the laser chamber 12. The cathode 15 is electrically connected to a high voltage side HV of a high-voltage power source 23, and the anode 14 and the laser chamber 12 are electrically connected to a grounding side GND of the high-voltage power source 23. High voltage is applied between the discharge electrodes 14 and 15 from the high-voltage power source 23 to cause a primary discharge in a pulse form in a discharge space 37, thereby causing laser light in the pulse form.

In this situation, a shock wave 41 occurs from the discharge space 37 as a result of the primary discharge. The shock wave 41 is reflected at components in the vicinity of the discharge electrodes 14 and 15, and is returned to the discharge space 37, whereby the density of a laser gas in the discharge space 37 fluctuates. As a result, the primary discharge becomes unstable, and the beam profile, energy stability, and wavelength stability of the laser light are disturbed. In order to prevent this, in the aforementioned Japanese Patent Application Laid-open No. 4-328889, porous ceramics 46 and 46 are fixed on the cathode base 36 and the anode base 40, respectively. The porous ceramics 46 and 46 as described above absorb the shock wave 41 and prevent the shock wave 41 from returning to the discharge space 37.

However, the aforementioned prior art has the disadvantages as described below.

Specifically, in FIG. 17, the cathode 15 and the laser chamber 12 are electrically insulated from each other, and on the occasion of primary discharge, a large potential difference occurs between them. Thus, creeping discharge sometimes occurs between the cathode 15 and the laser chamber 12 via the surface of the porous ceramic 46. As a result, primary discharge is not carried out favorably, thus causing the disadvantages that the output of laser light is reduced and in an extreme instance, laser light is not generated. In order to avoid creeping discharge, it is advisable to make a distance between the cathode 15 and the laser chamber 12 longer, but this makes the excimer laser device 11 larger.

To prevent creeping discharge, the art of providing projections and depressions on the cathode base 36 to form a rib portion is known. According to this, the insulation distance between the cathode 15 and the laser chamber 12 is lengthened, and creeping discharge hardly occurs.

Further, in view of the demand for increase in the repetition frequency of laser oscillation in recent years, the need for reducing inductance of primary discharge arises. For this purpose, it is necessary to reduce an area of a current loop formed by a return plate (not shown) for electrically connecting the cathode 15 and the anode 14, and the anode 14 and the laser chamber 12. As a result, the distance between the cathode 15 and the laser chamber 12 is shortened, and the creeping discharge between the cathode 15 and the laser chamber 12 easily occurs. The aforementioned rib portions are also necessary to prevent this.

However, the phenomenon, in which shock waves 41 generating from the discharge space 37 enter the recessed portions of the rib portion and are reflected toward the discharge space 37 at a high reflectivity, sometimes occurs. Thus, there arises the disadvantage that the shock waves 41 make the beam profile, energy, and wavelength unstable as described above.

SUMMARY OF THE INVENTION

The present invention is made in view of the above-described disadvantages, and its object is to provide a pulse oscillating gas laser device which can reduce effects of shock waves caused by primary discharge and perform stable laser oscillation.

In order to attain the above-described object, a pulse oscillating gas laser of the present invention is a pulse oscillating gas laser device for exciting a laser gas by causing primary discharge in a pulse form between a pair of discharge electrodes opposing each other and oscillating laser light, and has the constitution in which a rib portion with insulating properties for preventing creeping discharge is provided on a cathode base with insulating properties, to which the discharge electrode at a high voltage side of a pair of the discharge electrodes is fixed, and a damping material for attenuating shock waves caused by the primary discharge is inserted in an inside of a groove portion between a raised portion of the rib portion and the high-voltage side discharge electrode.

According to the above constitution, the shock waves are attenuated favorably, and the rib portion with insulation properties makes it possible to prevent creeping discharge.

Further, in the pulse oscillating gas laser device, the damping material may be inserted into a recessed portion of the rib portion.

According to the above constitution, the shock waves emitted to a distance from the discharge electrodes are also attenuated, and therefore the effect of the shock wave is reduced.

Furthermore, in the pulse oscillating gas laser device, the damping material may be in close contact with a side face of the raised portion and a side face of the high-voltage side discharge electrode, and may be formed into a U-shape.

According to the above constitution, the shock waves reflected at the surface of the damping material can be also prevented from returning to the discharge space, and the shock waves can be attenuated at high efficiency.

Still further, in the pulse oscillating gas laser device, the damping material may be provided in close contact with the discharge electrode at a grounding side of a pair of the discharge electrodes.

According to the above constitution, the shock waves emitted toward both of the high-voltage side and grounding side are attenuated, and therefore the effect of the shock waves can be reduced.

Further, in the pulse oscillating gas laser device, the damping material is a porous material with porosity of not less than 90%.

According to the above constitution, the porous material with high porosity is used, thus making it possible to attenuate the shock waves more efficiently.

BRIEF DESCRIPTION OF THE DRAWINGS

FIG. 3 is a sectional view of a rib portion of the excimer laser device according to the first embodiment;

BEST MODE FOR CARRYING OUT THE INVENTION

Preferred embodiments according to the present invention will be explained in detail below with reference to the drawings.

Figure 1:
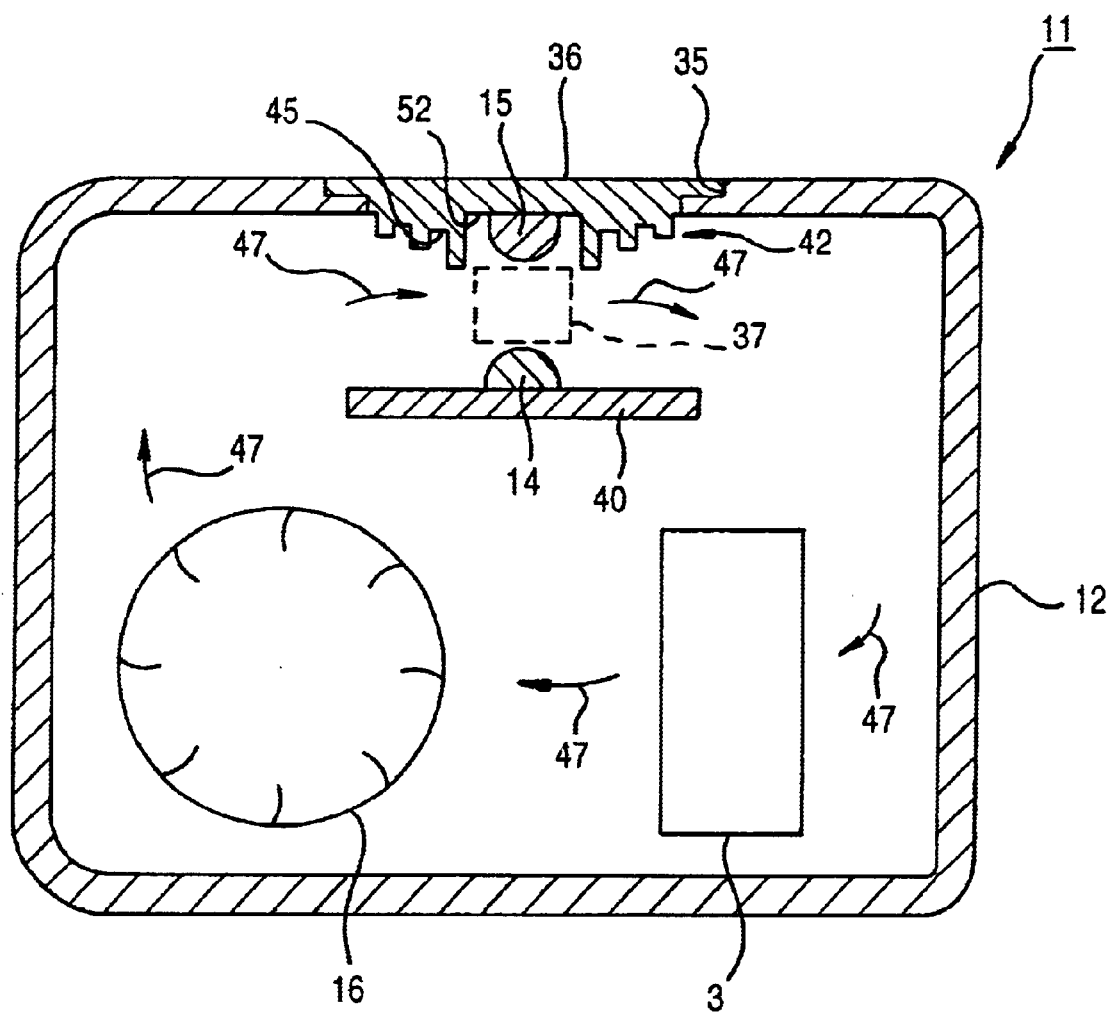
FIG. 1 is a sectional view of an excimer laser device according to a first embodiment of the present invention.

First, a first embodiment will be explained. FIG. 1 shows a sectional view perpendicular to a longitudinal direction of discharge electrodes 14 and 15, of an excimer laser device 1 according to the present embodiment. In FIG. 1, the excimer laser device 11 includes a laser chamber 12 in which a laser gas containing, for example, fluorine (F2), krypton (Kr) and neon (Ne) is sealed at a predetermined pressure ratio. Inside the laser chamber 12, the discharge electrodes 14 and 15 comprising the anode 14 and the cathode 15 are placed to oppose each other in a vertical direction with a discharge space 37 between them. A high voltage is applied to the discharge electrodes 14 and 15 from a high-voltage power source not shown in FIG. 1, whereby a primary discharge in a pulse form occurs in the discharge space 37. Thereby, the laser gas is excited, and laser light occurs in a direction perpendicular to the paper face in FIG. 1.

As shown in FIG. 1, inside the laser chamber 12, a circulating fan 16 for circulating the laser gas inside the laser chamber 12 and feeding it to the discharge space 37, and a heat exchanger 3 for cooling the laser gas heated by discharge are placed at predetermined positions, respectively. A flow of the laser gas in this situation is shown by the arrows 47, and it passes through the discharge space 37 from the left to the right of FIG. 1. Hereinafter, the left side with respect to the discharge space 37 in FIG. 1 is called an upstream side and the right side is called a downstream side. In FIG. 1, the same plane as the paper face is called a beam section plane, and a direction perpendicular to the paper face is called a longitudinal direction of the discharge electrodes 14 and 15, or simply called a longitudinal direction.

Figure 2:
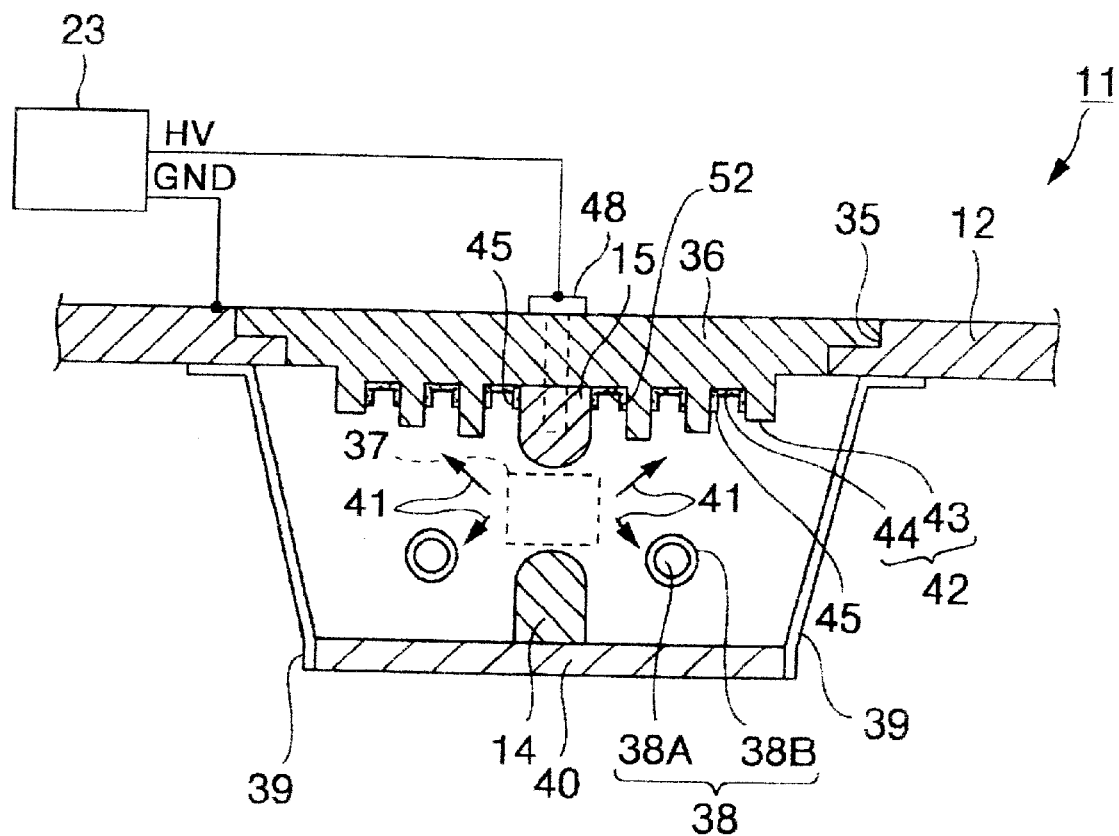
FIG. 2 is a sectional view near a discharge space of the excimer laser device according to the first embodiment.

FIG. 2 shows a detailed view near the discharge space 37. As shown in FIG. 2, a chamber opening 35 is provided at an upper portion of the laser chamber 12, and the chamber opening 35 is closed by a cathode base 36 comprising an insulator such as ceramic. An O-ring not shown is inserted between the laser chamber 12 and the cathode base 36 to seal the laser gas. The cathode 15 is fixed to the cathode base 36, and the cathode 15 and the laser chamber 12 are electrically insulated by the cathode base 36.

A plurality of high-voltage power supply rods 48 penetrating through the cathode base 36 to reach the cathode 15 are placed longitudinally at predetermined spaces between them at the upper portion of the cathode 36. The high-voltage power supply rods 48 are connected to a high voltage side HV of a high-voltage power source 23 via a discharge circuit (not shown), whereby a high-voltage current is supplied to the cathode 15. A gap between the high-voltage power supply rods 48 and the cathode base 36 is sealed by O-ring not shown.

Preionization electrodes 38 each composed of a rod-shaped inner conductor 38A made of copper or the like and a dielectric 38B for surrounding an outer circumference of the inner conductor 38A are placed at both sides of the anode 14. Upper portions of a plurality of return plates 39 in a plate form are fixed to an lower portion of an inner wall of the laser chamber 12 near the chamber opening 35 at predetermined spaces in the longitudinal direction with bolts (not shown). An anode base 40 being an electric conductor is fixed to lower portions of the return plates 39, and the anode 14 is mounted on an upper portion of the anode base 40. The laser chamber 12 is connected to a grounding side GND of the high-voltage power source 23 via the discharge circuit (not shown), and the anode 14 is at the same potential as the laser chamber 12 via the return plates 39.

As shown in FIG. 2, rib portions 42 each having a raised portion 43 and a recessed portion 44 in a groove form are integrally formed so as to surround the cathode 15, at the lower portion of the cathode base 36. This is to prevent creeping discharge from occurring between the cathode 15 and the laser chamber 12 to thereby prevent primary discharge from being unstable. Further, a clearance is produced between the cathode 15 and the innermost raised portion 43 of the rib portion 42, whereby groove portion 52 for surrounding the entire circumference of the cathode 15 is formed.

FIG. 3 shows a detailed sectional view of the rib portion 42. As shown in FIG. 3, a damping material 45 comprising a porous metal material or a porous ceramic material is inserted by being formed to be in a U-shape conforming to the shape of the recessed portion 44 of the rib portion 42. The similar damping material 45 is also inserted in the groove portion 52 between the cathode 15 and the rib portion 42 by being formed into a U-shape conforming to the shapes of the cathode 15 and the groove portion 52. The height of each damping material 45 is desired to be lower than the height of the raised portion 43 (for example, about ½), so that the insulation effect of the rib portion 42 is not reduced.

As for an example of the above-described porous metal material, for example, "CELMET", a trade name, made by Sumitomo Electric Industries, Ltd., "METAL FOAM" made by Mitsubishi Materials Corporation or the like is preferable. Meanwhile, as an example of the porous ceramic material, "CERAMIC FOAM", a trade name, made by Kurosakiharima Co. Ltd., or the like is preferable. As quality of a material, those with Al2O3, which has corrosion resistance against a halogen gas such as a fluorine gas and the like, as the main component is suitable.

These damping materials 45 have a number of pores 49 in their surfaces, and the pores 49 are also provided inside them. It is desirable that the pores 49 are communicated with each other. Thereby, if a shock wave 41 occurring in the discharge space 37 collides against the damping member 45, most of it enters the inside through the pores 49 provided in the surface of the damping member 45. Since the pores 49 are communicated with each other, the shock wave 41 is transmitted from one pore 49 to another pore 49, inside the damping material 45, and it is gradually attenuated in this process. As a result, the magnitude of the shock wave 41 returning to the discharge space 37 is reduced, and therefore uniformity in the density of the discharge space 37 is not lost by the shock wave 41, whereby the beam profile, energy stability, and wavelength stability of the laser light 21 are not disturbed.

When the experiment concerning attenuation was performed, the disturbance of the beam profile, energy stability, and wavelength stability was eliminated in the case with the porosity of 90% or more. Specifically, it is desirable that the porosity of the damping material 45 is not less than 90% in order to attenuate the shock wave 41 favorably and to sufficiently reduce the influence of the shock wave 41 returning to the discharge space 37. It should be noted that in this specification, the ratio of the volume of the space contained in the volume of the damping material 45 is called the porosity.

Figure 4:
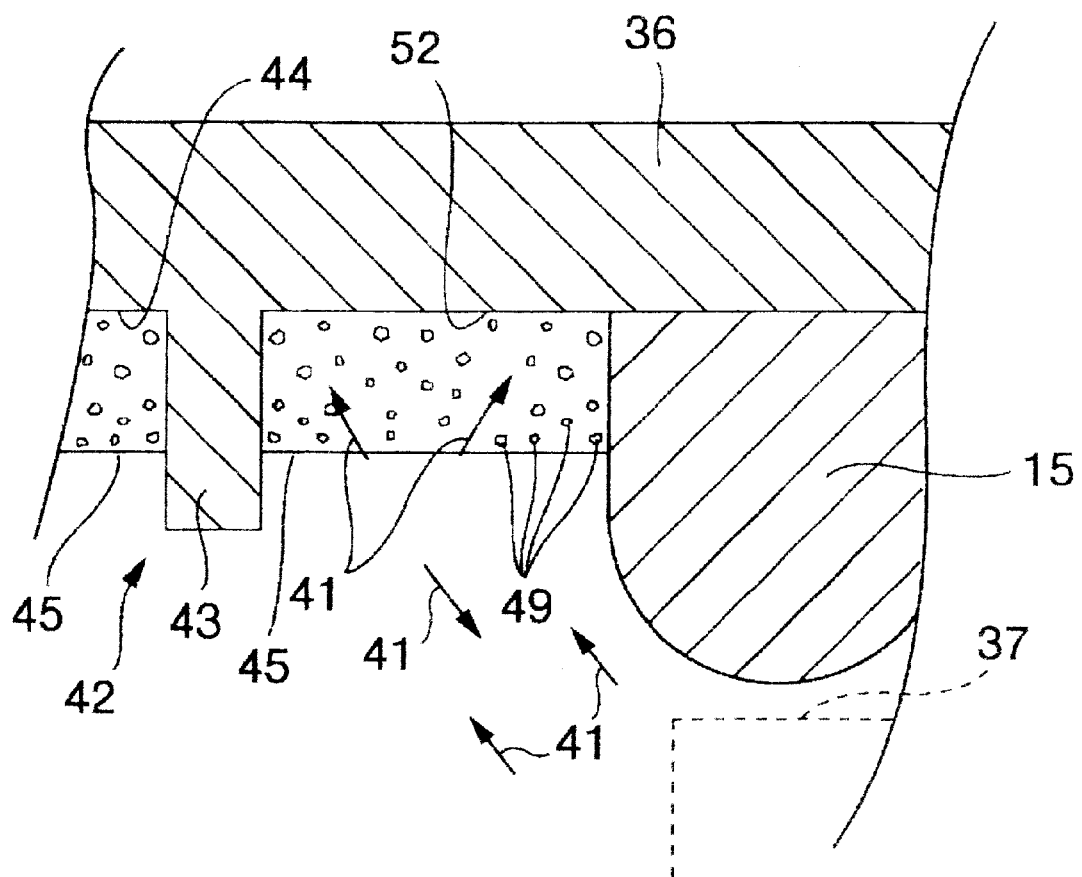
FIG. 4 is a sectional view of the rib portion assumed in order to explain insertion of a damping material in FIG. 3.

As the shape of the damping material 45, by forming it into a U-shape conforming to the inner surfaces of the recessed portion 44 and the groove portion 52, the attenuation of the shock wave 41 can be increased. Specifically, as shown in FIG. 4, when the damping material 45 is charged so as to fill the entire recessed portion 44 and groove portion 52, it frequently happens that the shock wave 41 reflected at their surfaces directly returns to the discharge space 37. On the other hand, as shown in FIG. 3, by forming the damping material 45 into a U-shape, the shock wave 41 enters the inside of the recessed portion 44 and the groove portion 52 once. As a result, the shock wave 41 does not immediately jump out of the recessed portion 44 and the groove portion 52 even if it is reflected at the surface of the damping material 45, but is incident on the damping material 45 again. Thereby, attenuation is efficiently carried out, and it hardly happens that the reflected shock wave 41 returns to the discharge space 37.

In this situation, as the damping material 45, a ceramic damping material is more desirable than a metal damping material. This is because the metal damping material is at the potential near the potential of the cathode 15, and the distance from the laser chamber 12 becomes short, thus easily causing creeping discharge.

In FIG. 2 and FIG. 3, the damping material 45 is inserted into all the recessed portions 44 and the groove portions 52, but what reflects the impact wave the most is the groove portion 52 that is the nearest to the anode 14. Accordingly, it is desirable that the damping material 45 is unfailingly inserted into at least the groove portion 52.

Other constitution examples of the excimer laser device 11 according to the first embodiment will be shown below.

Figure 5:
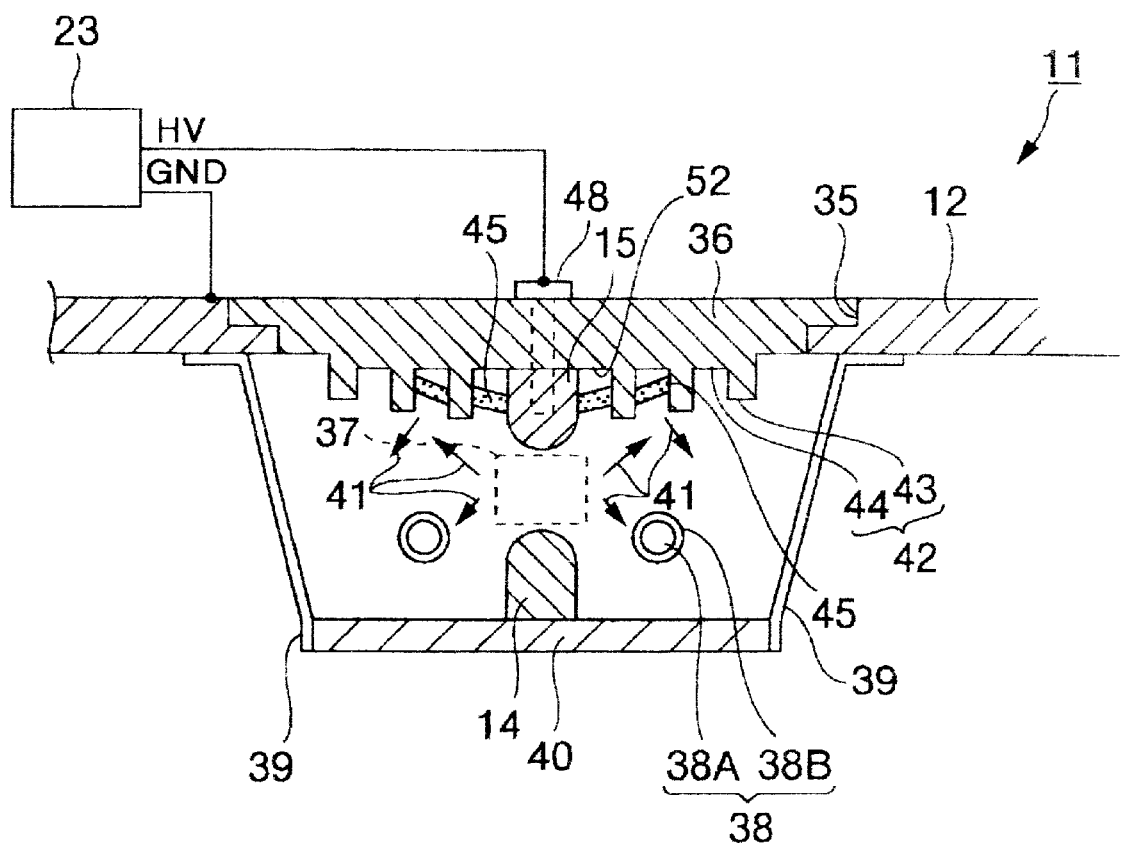
FIG. 5 is a sectional view of an area near the discharge space showing another first constitution example of the excimer laser device according to the first embodiment.

As a first constitution example, according to FIG. 5, the rib portions 42 are formed at the cathode base around the outer periphery of the cathode 15. The damping material 45 is provided in the groove portion 52 and the recessed portion 44 so that the damping material 45 has a slant raised to be higher at the cathode 15 side. Thereby, the shock wave 41 hit against the damping material 45 enters the inside thereof and is attenuated, or reflected at its surface in the direction away from the discharge space 37. Accordingly, it hardly happens that the shock wave 41 has an effect on the density of the laser gas at the discharge space 37.

As shown in FIG. 5, the damping material 45 may be provided so that spaces are provided between the damping material 45 and bottom portions of the groove portion 52 and the recessed portion 44, or it may be provided so that the spaces from the bottom portions of the groove portion 52 and the recessed portions 44 are filled. In this situation, the height of the damping material 45 is also desired to be lower than the height of the raised portion 43 as shown in FIG. 3.

Figure 6:
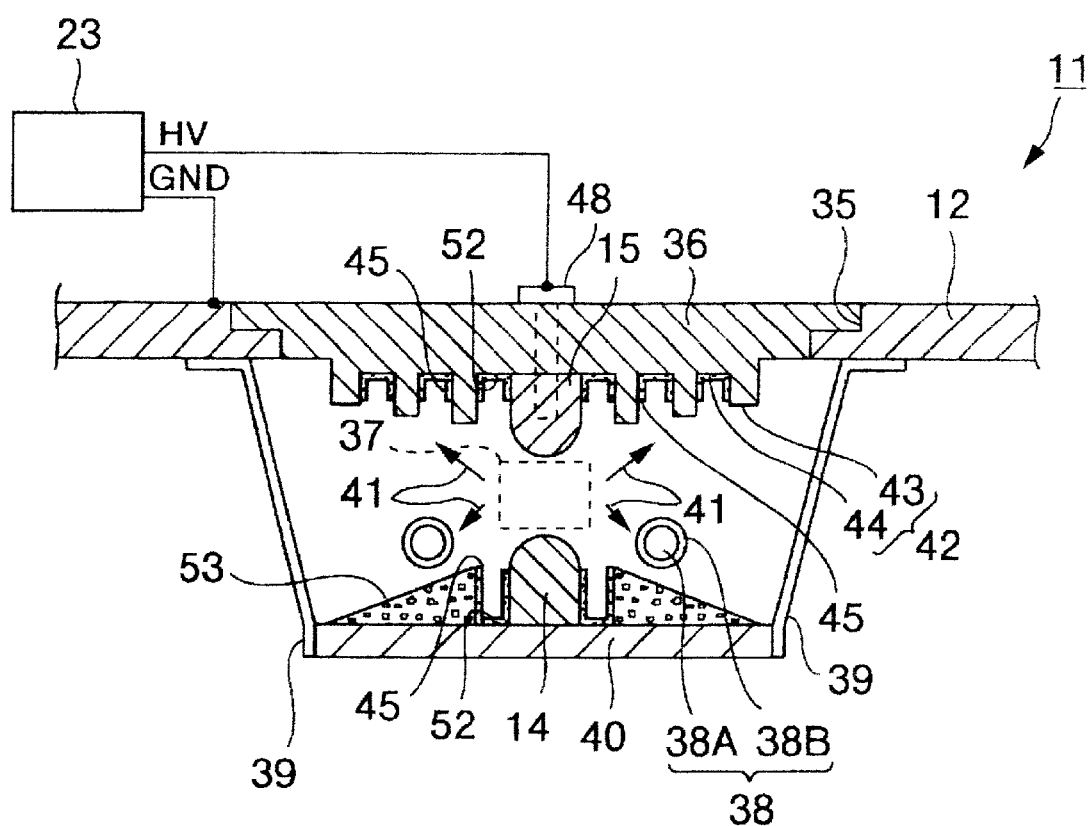
FIG. 6 is a sectional view of an area near the discharge space showing another second constitution example of the excimer laser device according to the first embodiment.

As a second constitution example, according to FIG. 6, the damping material 45 is inserted into the groove portion 52 and the recessed portions 44 in the outer periphery of the cathode 15. A damping material 53 is provided to have a slant raised to be higher toward the anode 14 in the outer periphery of the anode 14. A space is provided between the anode 14 and a damping material 53, which constitutes the groove portion 52. The U-shaped damping material 45 is inserted in the groove portion 52 as in FIG. 2.

According to this, the shock wave 41 hit against the damping material 53 having the slant, in the outer periphery of the anode 14, is reflected at its surface and goes away from the discharge space 37. The shock wave 41 entering an inside of the damping material 53 is attenuated. Thus, the shock wave 41 hardly has an effect on the density of the laser gas in the discharge space 37. Further, the shock wave 41 incident on the groove portion 52 between the anode 14 and the damping material 53 is attenuated by the U-shaped damping material 45 as in FIG. 2.

The damping material 45 and the damping material 53 may be integrally formed. Further, if the rib portion including the recessed and raised portions are provided on the surface of the damping material 53, the shock wave 41 can be attenuated more effectively. On the other hand, the anode 14 and the damping material 53 may be in close contact with each other without providing the groove portion 52.

Figure 7:
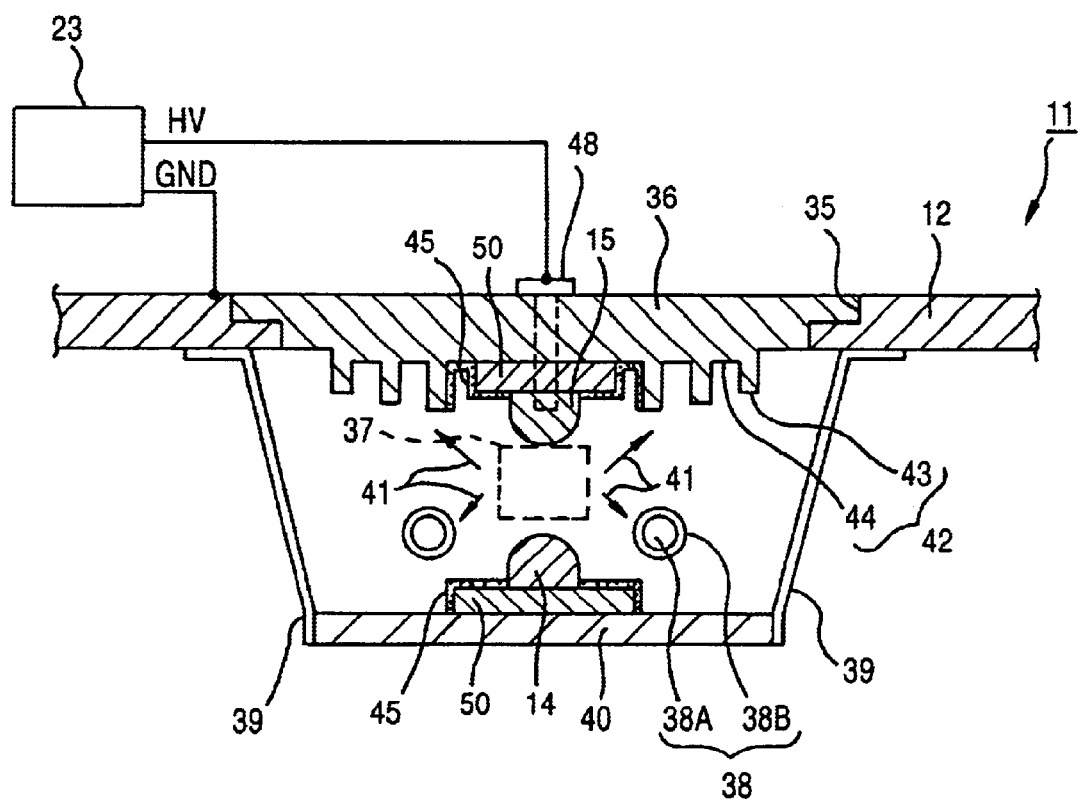
FIG. 7 is a sectional view of an area near the discharge space showing another third constitution example of the excimer laser device according to the first embodiment.

As a third constitution example, according to FIG. 7, middle bases 50 and 50 made of metal are inserted between the anode 14 and the anode base 40, and between the cathode 15 and the cathode base 36, respectively. The middle bases 50 and 50 are larger in width than the anode 14 and the cathode 15. By providing the damping material 45 to cover the middle bases 50, the damping material 45 can be placed at the position nearer to the discharge space 37, and the shock wave 41 can be surely attenuated.

Next, a second embodiment will be explained.

Figure 8:
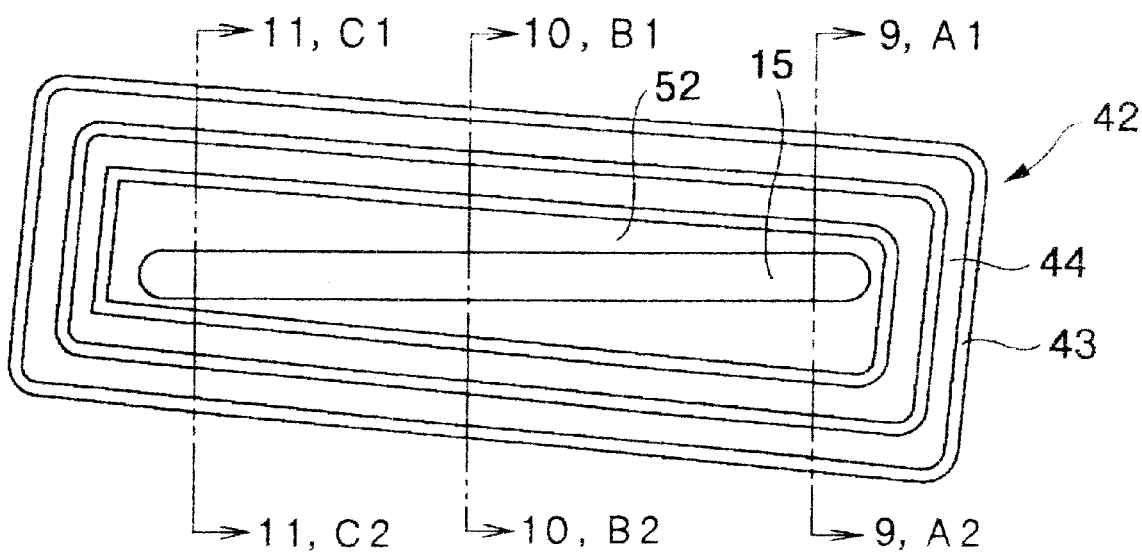
FIG. 8 is a bottom view of a cathode and a rib portion seen from the discharge space side of an excimer laser device according to a second embodiment of the present invention.

FIG. 8 shows a bottom view of the cathode 15 and the rib portion 42 seen in an upward direction from the discharge space 37 side. In FIG. 8, a rectangle formed by the groove portion 52 and the recessed portion 44 is obliquely placed with respect to the cathode 15, and the groove portion 52 and the recessed portion 44 are not in parallel with the cathode 15.

Figure 9:
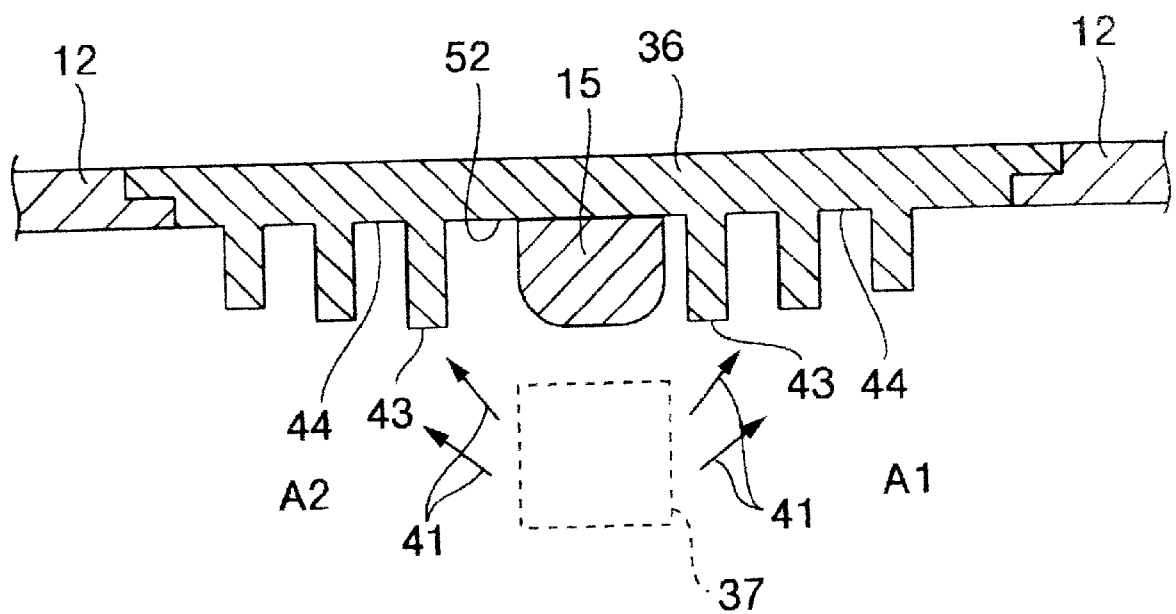
FIG. 9 is a section taken along the line 9—9 of FIG. 8, that is, a sectional view taken along spots A1 to A2.
Figure 10:
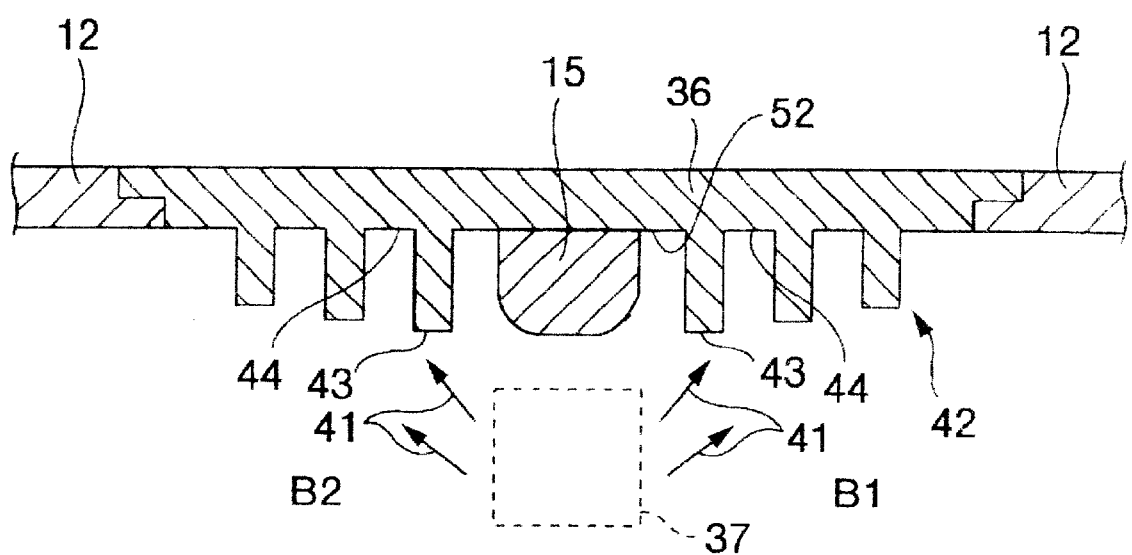
FIG. 10 is a section taken along the line 10—10 of FIG. 8, that is, a sectional view taken along spots B1 to B2.
Figure 11:
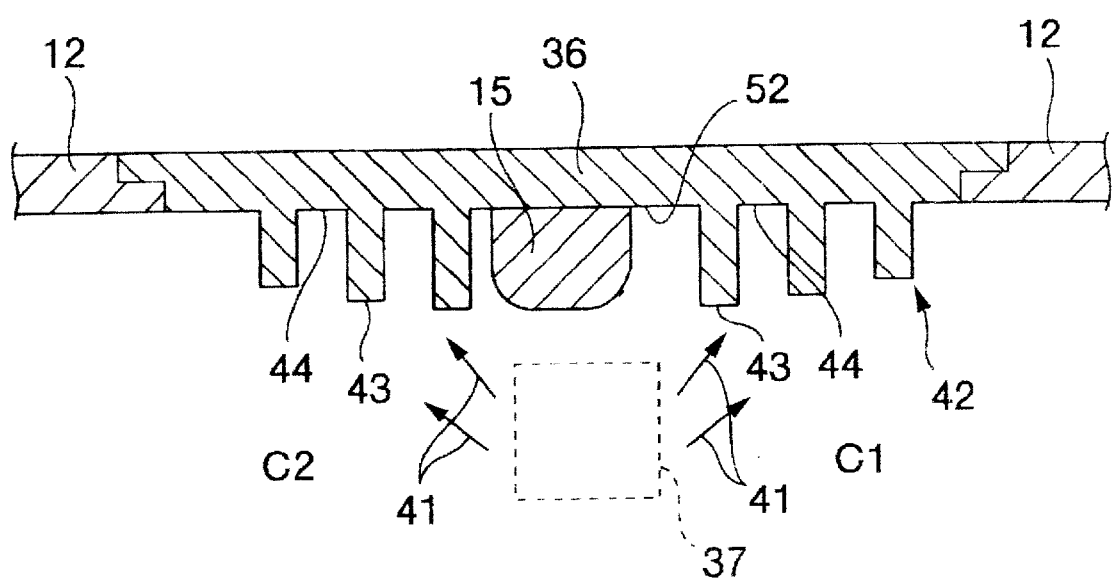
FIG. 11 is a section taken along the line 11—11 of FIG. 8, that is, a sectional view taken along spots C1 to C2.
Figure 12:
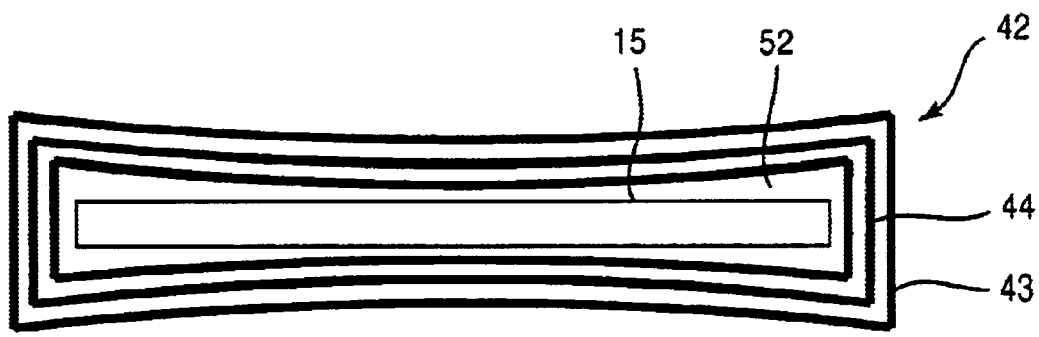
FIG. 12 is an explanatory view showing another first embodiment of the excimer laser device according to the second embodiment.
Figure 13:
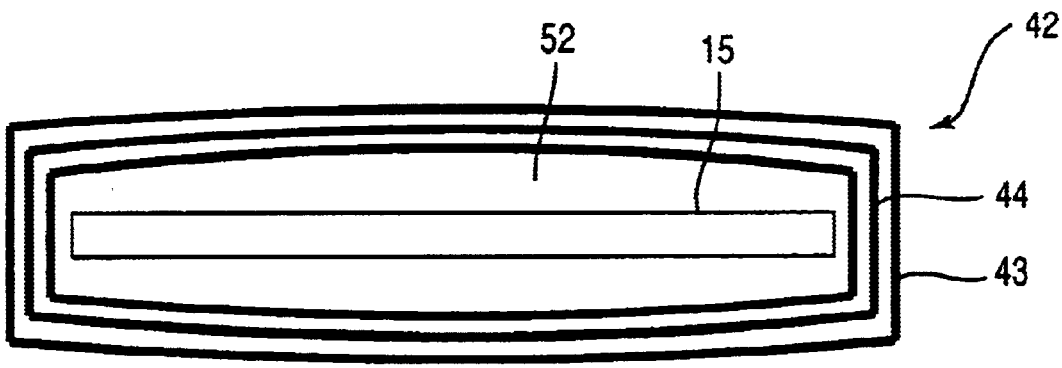
FIG. 13 is an explanatory view showing another second example of the excimer laser device according to the second embodiment.
Figure 14:
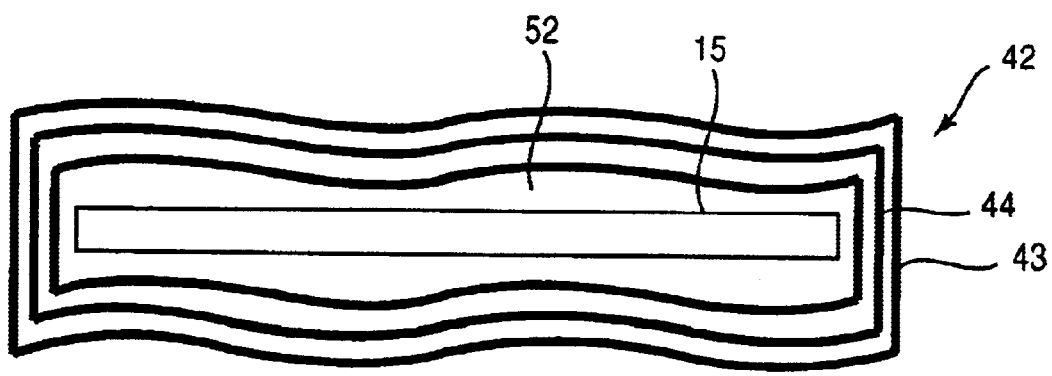
FIG. 14 is an explanatory view showing another third example of the excimer laser device according to the second embodiment.
Figure 15:
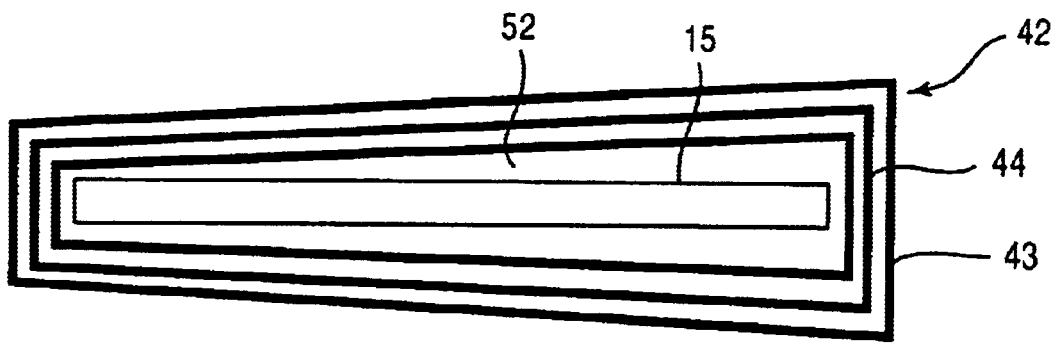
FIG. 15 is an explanatory view showing another fourth embodiment of the excimer laser device according to the second embodiment.

FIG. 9 to FIG. 11 show sectional views taken along the spots A1–A2, B1–B2, and C1–C2 in FIG. 8, respectively. As shown in FIG. 9 to FIG. 11, according to the second embodiment, the distances between the groove portion 52 and the recessed portion 44, and the cathode 15 change with respect to the longitudinal direction. For example, at the spot A1, the groove portion 52 and the recessed portion 44 are close to the cathode 15, but they are far from it at the spot C1.

As a result, the time period from the time at which the shock wave 41 occurring by pulse discharge is reflected at the groove portion 52 and the recessed portion 44 to the time at which it returns to the discharge space 37 differs according to the positions. Specifically, on the occasion of the next pulse discharge, if the reflected shock wave 41, for example, in the spot B1 in FIG. 8 returns to the discharge space 37, the shock wave 41 in the spot A1 nearer to the discharge space 37 passes through the discharge space 37, and the shock wave 41 in the spot C1 does not reach the discharge space 37.

A beam profile of laser light 21 is obtained by longitudinally accumulating gain distribution on a beam sectional plane at each position. Specifically, according to the prior art, the shock wave 41 exerts influence on the same position on the beam sectional plane, and therefore disturbance of the beam profile, energy stability, and wavelength stability is accumulated. On the other hand, according to the second embodiment, the influence of the shock wave 41 appears on different positions on the beam sectional place, and therefore, by accumulating it along the longitudinal direction, the influences are cancelled out each other. Thereby, the influence of the shock wave 41 is reduced, and the beam profile, energy stability, and wavelength stability are hardly disturbed.

FIG. 12 to FIG. 15 show other first to fourth examples of the rib portion 42 and the cathode 15 according to the second embodiment. As shown in each of the drawings, the width of the groove portion 52 is formed to be changed with respect to the longitudinal direction, whereby the distance between the rib portion 42 and the cathode 15 is changed with respect to the longitudinal direction, and the influence of the shock wave 41 can be reduced. In this situation, the width of the recessed portion 44 may be changed similarly. Further, in the second embodiment, if the damping material 45 as in the first embodiment is inserted into the groove portion 52 and the recessed portion 44, the shock wave 41 is attenuated by the damping material 45 and the influence exerted on the discharge space 37 is further reduced.

Next, a third embodiment will be explained.

Figure 16:
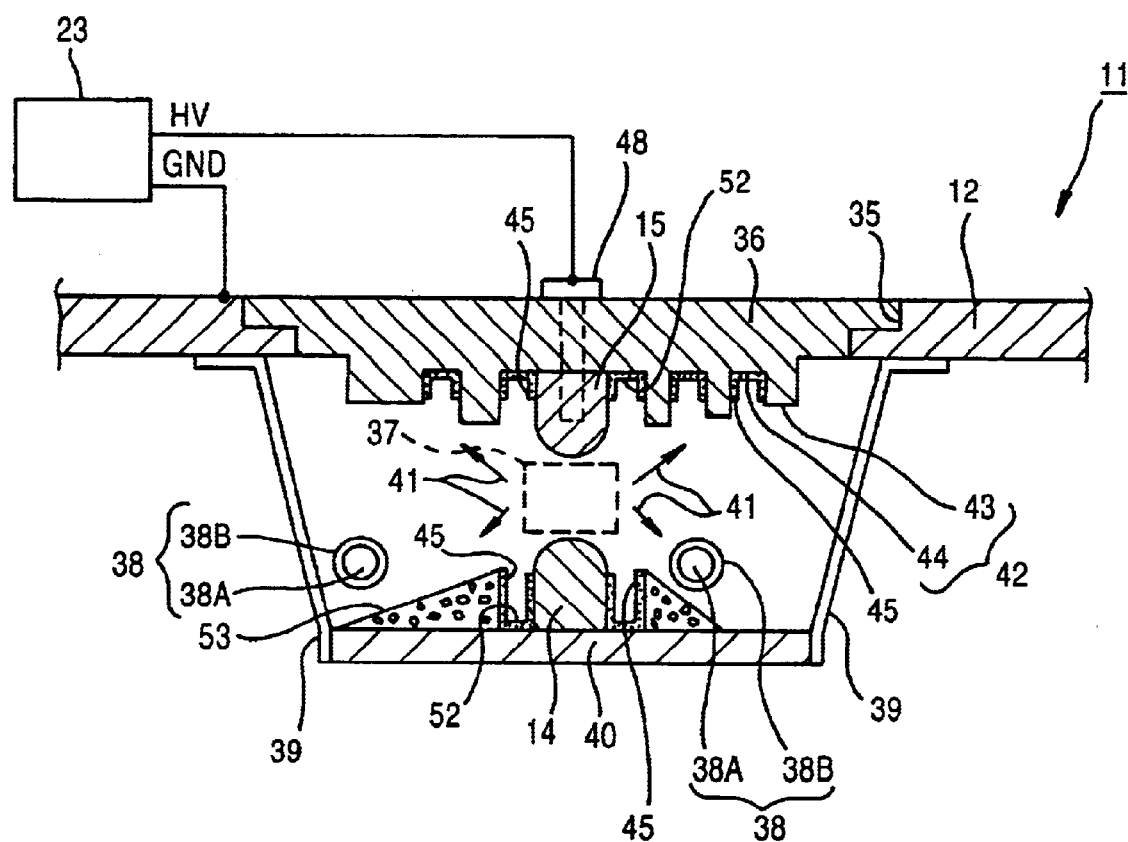
FIG. 16 is a detailed sectional view of an area near a discharge space of an excimer laser device according to a third embodiment of the present invention.
Figure 17:
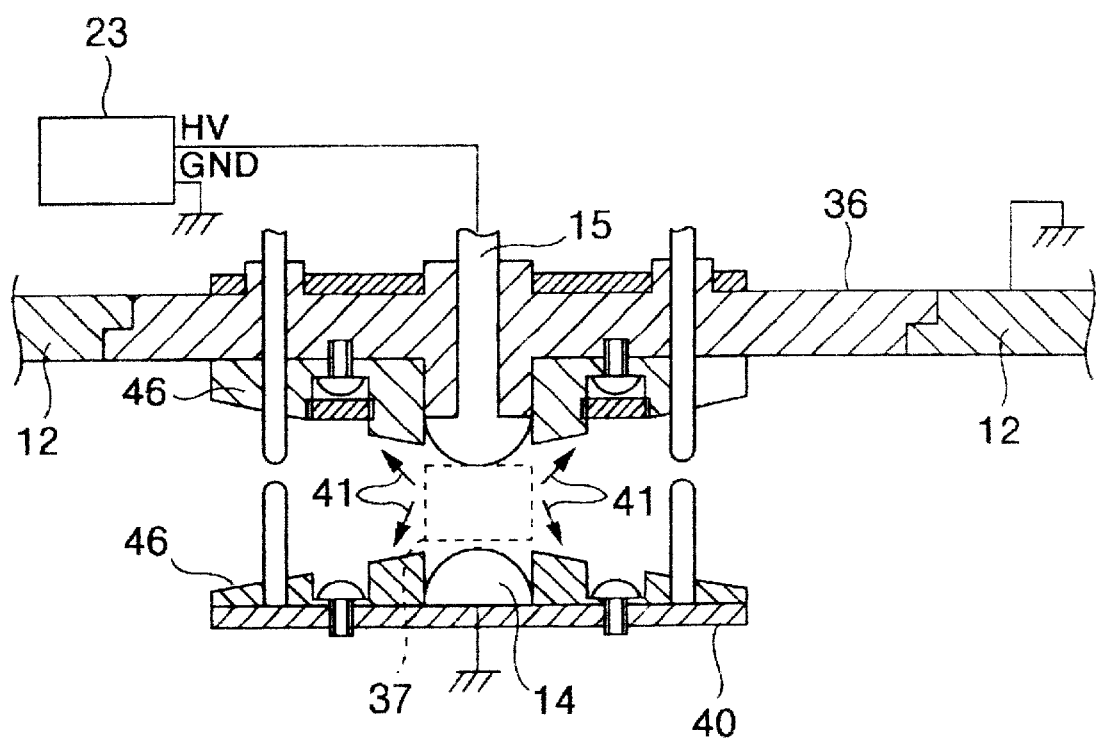
FIG. 17 is a sectional view of an area near a discharge space of an excimer laser device according to a prior art.

FIG. 16 shows a detailed sectional view of an area near the discharge space 37 of the excimer laser device 11 according to the third embodiment. In FIG. 16, the rib portion 42 in the outer peripheral portion of the cathode 15 includes different numbers of the recessed portions 44 at the upstream side and the downstream side of the cathode 15. Specifically, at the upstream side, the groove portion 52 and one recessed portion 44 exist between the cathode 15 and the laser chamber 12, and at the downstream side, the groove 52 and two of the recessed portions 44 exist. Further, these groove portion 52 and the recessed portions 44 are formed so that the distances from the cathode 15 are different from each other at the upstream side and the downstream side.

The shock waves 41 occurring in the discharge space 37 jump out to the upstream side and the downstream side of the cathode 15, are reflected at the groove portion 52 and the recessed portion 44 at each side and returned to the discharge space 37. In this situation, since the distances to the groove 52 and the recessed portion 44 at the upstream side and the downstream side are different, the period of time, in which the shock wave 41 returns to the discharge space 37 from the groove portion 52 and the recessed portion 44 at the upstream side, and the period of time, in which it returns to the discharge space 37 from the groove portion 52 and the recessed portion 44 at the downstream side, differ from each other.

Specifically, on the occasion of the next pulse discharge, it never happens that the shock wave 41 returning from the upstream side and the shock wave 41 returning from the downstream side collide against each other and intensify each other, and therefore influence of the shock wave 41 exerted on the beam profile, energy stability, and wavelength stability is reduced. By fitting the damping material 45 as explained in the first embodiment into the groove portion 52 and the recessed portion 44, the influence of the shock wave 41 can be further reduced.

Further, as shown in FIG. 16, the asymmetric damper materials 45 are provided in the outer periphery of the anode so as to have slants raised to be higher at the anode 14 side. This makes the laser gas flow through the discharge space 37 smoothly. The shock waves 41 are reflected at different angles at the surface of the damping material 45 at the upstream side and at the surface of the damping material 45 at the downstream side, and therefore it never happens that they reach the discharge space 37 at the same time and strengthen each other. Accordingly, the influence of the shock waves 41 on the beam profile, energy stability, and wavelength stability is reduced.

Further, as shown in FIG. 16, it is more preferable that the distances between the preionization electrodes 38 and 38 and anode 14 are changed at the upstream side and downstream side. Thereby, the shock waves 41 hit against and reflected at the preionization electrodes 38 do not strengthen each other at the upstream side and the downstream side, thus reducing the influence of the shock waves 41.

As for the present invention, the explanation is made with the excimer laser device 11 being taken as an example, but the same explanation is applied to fluorine molecular laser devices. Further, the explanation is made so that the cathode 15 is placed above the discharge space 37 and the anode 14 is placed below the discharge space 37, but this is not restrictive. Specifically, the anode 14 may be placed above the discharge space 37 to be at the same potential as the laser chamber 12, and the cathode 15 may be placed below the discharge space 37. In such a case, a rib portion for avoiding creeping discharge is needed in the outer periphery of the cathode 15, on the cathode base 36 with insulation properties on which the cathode 15 is mounted. Accordingly, by inserting the damping material into at least the groove portion formed in the outer periphery of the cathode 15, the shock waves 41 are attenuated. The same thing can be applied to the recessed portion of the rib portion, and the outer periphery of the anode 14.

What is claimed is:

1. A pulse oscillating gas laser device for exciting a laser gas by causing primary discharge in a pulse form between a pair of discharge electrodes opposing each other and oscillating laser light, wherein a rib portion with insulating properties for preventing creeping discharge is provided on a cathode base with insulating properties to which the discharge electrode at a high voltage side of said pair of discharge electrodes is fixed, and wherein a damping material for attenuating a shock wave caused by the primary discharge is inserted in an inside of a groove portion between a raised portion of said rib portion and said high-voltage side discharge electrode.

2. The pulse oscillating gas laser device according to claim 1, wherein the damping material is inserted in a recessed portion of said rib portion.

3. The pulse oscillating gas laser device according to claim 1, wherein said damping material is in close contact with a side face of said raised portion and a side face of said high-voltage side discharge electrode and is formed into a U-shape.

4. The pulse oscillating gas laser device according to any one of claim 1, claim 2 and claim 3, wherein the damping material is provided in close contact with the discharge electrode at a grounding side of said pair of discharge electrodes.

5. The pulse oscillating gas laser device according to any one of claim 1, claim 2 and claim 3, wherein said damping material is a porous material with porosity of not less than 90%.

6. The pulse oscillating gas laser device according to claim 4, wherein said damping material is a porous material with porosity of not less than 90%.

7. A pulse oscillating gas laser device for exciting a laser gas by causing primary discharge in a pulse form between a pair of discharge electrodes opposing each other and oscillating laser light, wherein a rib portion with insulating properties for preventing creeping discharge is provided on a cathode base with insulating properties to which the discharge electrode at a high voltage side of said pair of discharge electrodes is fixed, wherein a damping material for attenuating a shock wave caused by the primary discharge is inserted in an inside of a groove portion between a raised portion of said rib portion and said high-voltage side discharge electrode, and wherein a damping material having a slant raised toward the discharge electrode at a grounding side is provided in an outer periphery of said grounding side discharge electrode of said pair of discharge electrodes.

8. A pulse oscillating gas laser device for exciting a laser gas by causing primary discharge in a pulse form between a pair of discharge electrodes opposing each other and oscillating laser light, comprising:

a rib portion with insulating properties for preventing creeping discharge is provided on a cathode base with insulating properties, to which the discharge electrode at a high voltage side of the pair of said discharge electrodes is fixed, and wherein said portion is formed not in parallel with said high-voltage side discharge electrode in a longitudinal direction of said high-voltage side discharge electrode around the portion of said cathode base where said high-voltage side discharge electrode is fixed.

* * * * *